July 19, 1949.  L. BERG  2,476,477
REFLUX DISTILLATION APPARATUS
Filed March 4, 1946
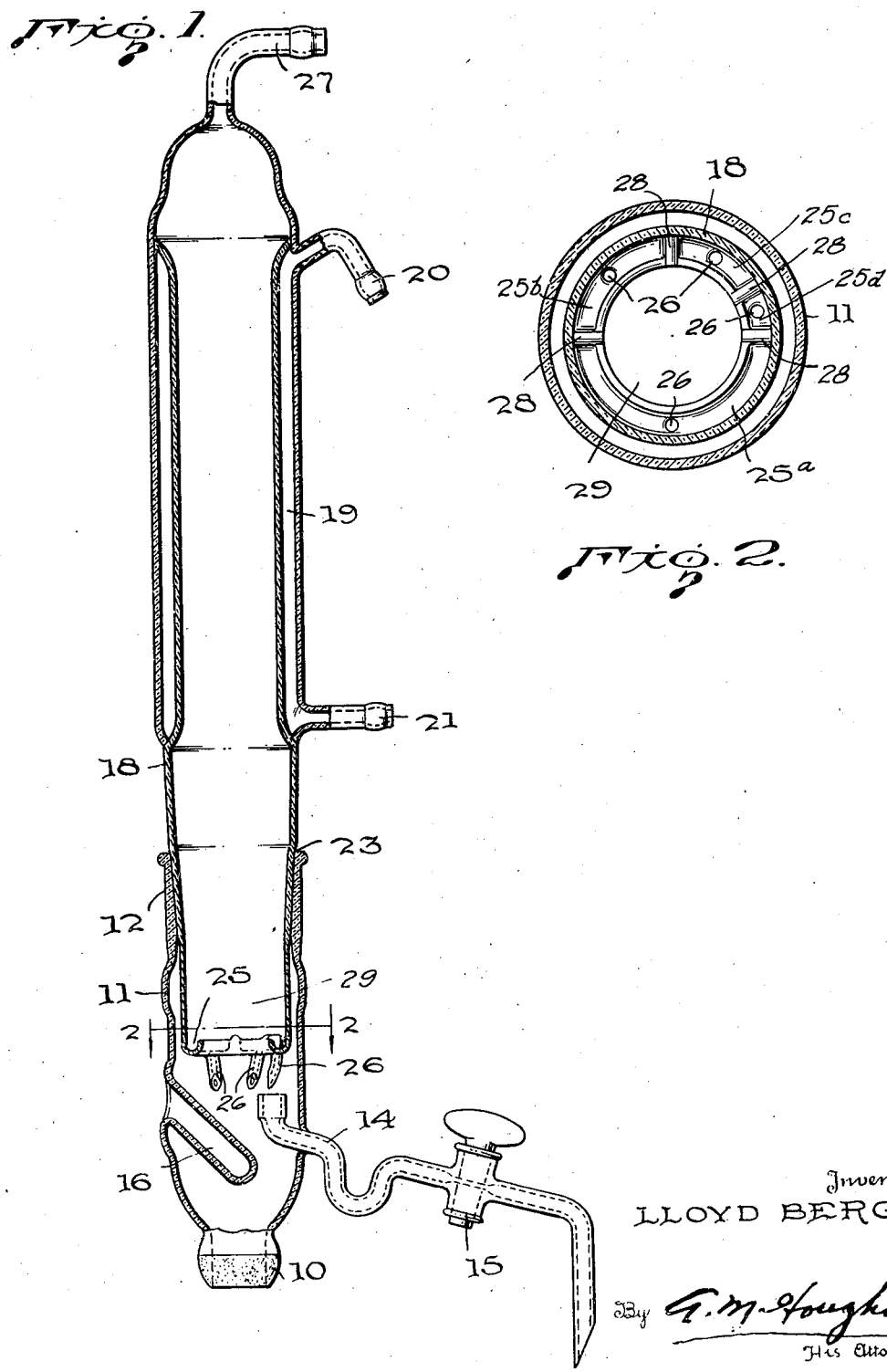
Inventor
LLOYD BERG
By G. M. Houghton
His Attorney Patented July 19, 1949

2,476,477

UNITED STATES PATENT OFFICE 2,476,477

REFLUX DISTILLATION APPARATUS

Lloyd Berg, O'Hara Township, Allegheny County, Pa., assignor to Gulf Research & Development Company, Pittsburgh, Pa., a corporation of Delaware Application March 4, 1946, Serial No. 651,915

7 Claims. (Cl. 257—34)

This invention relates to a reflux distillation apparatus and more particularly to a reflux condenser or distillation apparatus for establishing a constant reflux ratio.

It is ofttimes desirable in refluxing to withdraw a sample of the liquid being refluxed and for this purpose it is desirable to establish a fixed reflux ratio; that is, a ratio of the condensed material returned to the still pot to the condensed material removed from the system. There have been a number of methods and devices in the prior art for accomplishing this. For example, a stopcock may be used to withdraw some of the condensed liquid but it is difficult to so manipulate the stopcock as to remove a definite predetermined quantity of the reflux. Other devices include one employing a magnetically operated valve which intermittently removes a portion of the reflux but this involves a rather complicated apparatus and the reflux is intermittent and not constant, which is an important factor, particularly in precise analytical distillations.

An object of this invention is to provide an apparatus which will automatically and constantly maintain a predetermined ratio between the amount of distillate withdrawn and the amount returned to the system as reflux.

Another object of this invention is to provide an apparatus which by means of a simple adjustment will constantly and automatically maintain any one of several predetermined ratios between the amount of distillate withdrawn and the amount returned to the system as reflux.

These and other objects of this invention are attained by my apparatus which comprises generally a two piece head adapted to be mounted on a source of vaporized liquid such as a distilling column or a still pot or flask and comprising an upper member fitted to and capable of rotation with respect to a lower member, said upper member having a trough inside its lower edge divided in measured segments, each having an aperture therein for allowing condensed liquid to fall into said lower member, said lower member being provided with a conduit in one side thereof adapted to collect condensate from one selected aperture in said upper member and remove the liquid so collected from the system while the liquid from the remaining apertures is returned to the system.

Thus, the device is a distilling head for removing a portion of reflux of the non-intermittent type which gives a constant reflux ratio regardless of distillation rate, has no moving parts and can be readily built by a skilled glass blower.

A preferred embodiment of the invention is illustrated in the accompanying drawings, in which:

Figure 1 is a vertical view, partly in section, of a distilling head according to this invention; and Figure 2 is a sectional view of the head taken at line 2—2 of Figure 1.

Referring to Figure 1, there is shown a distilling head which may be mounted upon a conventional distilling column, still pot, or flask, not shown, by means of joint 10, which may be a ground glass joint. Joint 10 is a part of the lower portion 11 of the distilling head, which has a collar 12 adapted to receive the upper portion of the distilling head. In the side wall of portion 11 there is fixed a conduit or tube 14 which may be provided with a stopcock 15. Lower portion 11 may also be provided with a thermometer well 16 in which may be inserted a thermometer, not shown, for the purpose of checking the distillation temperature.

The upper portion of the distilling head is an elongated cylindrical member having a condensing surface 18 surrounded by a jacket 19 in which a cooling fluid such as water may be circulated by means of conduits 20 and 21. Upper portion 18 is provided with a collar section 23 adapted to seat in the collar 12 of the lower portion of the distilling head. The condensing surface 18 is curved upwardly and inwardly at the bottom to form a trough referred to generally in Figure 1 by the reference numeral 25 which is provided with a plurality of conduits or nipples 26. At the upper end of the condensing surface is provided a conduit 27 for the escape of any non-condensed material.

With reference to Figure 2, which is a section taken on the lines 2—2 of Figure 1, there is shown the wall of lower portion 11 surrounding the wall 18 of the upper portion inside of which is located the trough 25 divided into segments 25a, 25b, 25c and 25d by partitions 28. The space indicated at 29 is the means by which the distillation vapors pass up to contact the cooling jacket. In the drawing shown, the trough 25 is divided into four segments of approximately 180°, 90°, 60° and 30°, respectively, although it is to be understood that they may be of different number and arrangement to suit various requirements.

In the operation of the apparatus, vapors enter the lower portion 11, pass through the open space 29 into the upper portion 18 and rise until they are condensed by means of the water jacket on the walls of upper portion 18. The liquid runs downward by gravity into the trough 25 which divides it into the various portions. The liquid then flows downwardly through the nipples and back into the system unless one of the nipples 26 has been adjusted by rotation of the upper portion of the distilling head relative to its lower portion to discharge into the open end of tube 14 in which case the portion of the reflux liquid collected in the segment of the trough above that particular nipple may be withdrawn from the apparatus through tube 14 while the remainder of the reflux liquid discharging from the other nipples 26 returns to the column or flask to which the distilling head is fitted. In this manner a constant reflux ratio may be established and it is possible to constantly remove predetermined portions of the reflux with the trough divided, for example in 180°, 90°, 60° and 30° segments respectively. Accordingly the reflux ratios, that is, the amount of reflux liquid returned to the column or flask to the amount withdrawn from the apparatus may in such case be selectively adjusted to 1:1, 3:1, 5:1 or 11:1 respectively.

While the apparatus may be constructed of any of a number of materials, it is preferably constructed of glass and this is easily done by any skilled glass blower. The dimensions may be varied considerably, but care should be taken that trough 25 is deep enough and nipples 26 large enough so that the liquid does not run over the top of the trough. The condensing tube should be clean and smooth and kept vertical so that channeling of the condensed liquid will not occur. Heterogeneous distillates may be handled by the device without difficulty.

The device is adaptable to operation at pressures other than atmospheric if desired. To operate at high pressures or under vacuum conduit 27 may be sealed off or it may be connected to the source of pressure or vacuum. Similarly tube 14 may also be connected with the pressure or vacuum source.

This device is particularly advantageous in that it gives a constant reflux ratio regardless of distillation rate. By proper design almost any predetermined reflux ratio can be obtained. The device requires no attention while in operation, it has no moving parts, and its cost of construction is low. It may be operated under vacuum or pressure and can handle heterogeneous as well as homogeneous condensates.

What I claim is:

1. In an apparatus for selectively obtaining a constant reflux ratio having a source of vaporized liquid to be refluxed and a condensing surface, the improvement comprising a trough extending from the condensing surface at its lower end and divided into a plurality of segments, selectively operated means for withdrawing condensate from at least one of said segments, and means for returning the rest of the condensate to said source.

2. In an apparatus for selectively obtaining a constant reflux ratio, a distilling head attached to a source of vaporized liquid, said distilling head comprising an upper member having a condensing surface, a trough at the lower end of said condensing surface divided into a plurality of measured segments each segment draining through a downwardly directed nipple projecting into the distilling head, and a lower member inter-fitted with said upper member so that one may be rotatably adjusted relative to the other, said lower member having a conduit adapted to receive condensate from any one nipple when one said member is rotated to selected position with respect to the other, and to remove such condensate from the system while allowing the condensate from the other nipples to return to said source.

3. In an apparatus for selectively obtaining a constant reflux ratio having a distilling head attached to a source of vaporized liquid, said distilling head comprising: an upper member having a substantially cylindrical vertical condensing surface surrounded by a cooling jacket and having an annular trough at the lower inside end of said condensing surface, said annular trough being divided into a plurality of segments by partitions, each segment being provided with a downwardly directed nipple; and said distilling head further comprising a lower member adapted to be selectively positioned with respect to said upper member and having a conduit therein adapted to catch the condensate from one nipple and remove it from the system while the remainder of the condensate is returned to said source.

4. A distilling head for selectively obtaining a constant reflux ratio comprising a condensing surface, an angularly projecting trough at the lower end of said condensing surface arranged to collect liquid flowing thereover, said trough being divided into a plurality of segments, means for withdrawing condensate from at least one of said segments and means for refluxing the rest of the condensate.

5. A distilling head for selectively obtaining a constant reflux ratio comprising a condensing surface, a trough at the lower end of said condensing surface divided by partitions into a plurality of measured segments, a conduit adapted to remove liquid from any one selected segment and means for returning the liquid from the other segments to reflux.

6. A distilling head for selectively obtaining a constant reflux ratio comprising an upper and lower member rotatable with respect to each other, said upper member comprising a substantially cylindrical condensing surface having a trough at the lower end thereof adapted to receive all liquid condensed on said condensing surface, said trough being divided into a plurality of segments by partitions and each segment being provided with an aperture, said lower member having a conduit therein adapted to be arranged immediately beneath the aperture in any selected segment of the trough of said upper member.

7. A distilling head for selectively obtaining a constant reflux ratio comprising an upper member having a substantially cylindrical vertical condensing surface surrounded by a cooling jacket and having an annular trough at the lower inside end of said condensing surface adapted to receive all liquid condensed on said condensing surface, said annular trough being divided into a plurality of segments by means of partitions, each segment being provided with a downwardly directed nipple and a lower member adapted to be rotated to a fixed position with relation to said upper member and having a conduit therein adapted to catch the condensed liquid from one selected nipple and remove it from the apparatus, the condensed liquid from the remainder of the nipples continuing to flow downwardly within the distilling head as reflux.

LLOYD BERG.

(References on following page)

REFERENCES CITED

The following references are of record in the file of this patent:

UNITED STATES PATENTS

| Number | Name | Date |
|---|---|---|
| 66,243 | Morfit | July 2, 1867 |
| 574,626 | Pattison | Jan. 5, 1897 |
| 1,673,373 | Peters, Jr. | June 12, 1928 |
| 2,427,142 | Hornbacher et al. | Sept. 9, 1947 |

FOREIGN PATENTS

| Number | Country | Date |
|---|---|---|
| 22,826 | Austria | Jan. 25, 1906 |
| 507,360 | Germany | Sept. 16, 1930 |